United States Patent [19]

Tien

[11] Patent Number: 5,257,938
[45] Date of Patent: Nov. 2, 1993

[54] GAME FOR ENCODING OF IDEOGRAPHIC CHARACTERS SIMULATING ENGLISH ALPHABETIC LETTERS

[76] Inventor: Hsin C. Tien, 820 N. Capitol Ave., Lansing, Mich. 48906

[21] Appl. No.: 828,288

[22] Filed: Jan. 30, 1992

[51] Int. Cl.$^5$ ............................................. G09B 19/22
[52] U.S. Cl. .................................. 434/128; 434/157; 273/236
[58] Field of Search ............... 434/157, 156, 159, 160, 434/167, 178, 128; 273/299, 300, 302, 272, 273, 268, 236

[56] References Cited

FOREIGN PATENT DOCUMENTS 0275489 11/1990 Japan ................................ 434/157
9013883 11/1990 World Int. Prop. O. ......... 434/157

OTHER PUBLICATIONS

"An Introduction to Pinxxiee (Pin-Shay) Translingual Dictionary" by H. C. Tien, produced by PINXXIEE Corporation.

*Primary Examiner*—Gene Mancene
*Assistant Examiner*—Jeffrey A. Smith
*Attorney, Agent, or Firm*—Charles W. Chandler

[57] ABSTRACT

A game is disclosed for teaching the players the new multilingual alphabet of Tienstrokes on paper, video or computer screen, or any other information or communication device, as the Global Education Alphabet, composed of only ten English letters, simulating ten fundamental Chinese ideographic strokes. This translingual graphic alphabet represents ten basic hand motions as embodied in the Tienstrokes Indicators. The game shows how Chinese ideographs are transformed into Tienstrokes Similacode, an ideographic sequence of English letters. The Tienstrokes Similacode is then looked up in the dictionary to ascertain the corresponding words spelled in English, Japanese, Chinese or any other phonetic script.

4 Claims, 9 Drawing Sheets

| 1ST THROW / 2ND THROW | 2 | 3 | 4 | 5 | 6 | 7 | 8 | 9 | 10 | 11 | 12 |
|---|---|---|---|---|---|---|---|---|---|---|---|
| 2 | 一 | 冖 | 氵 | 子 | 阝 | 巛 | 女 | 山 | 三 | 干 | 一 |
| 3 | 大 | 万 | 工 | 艹 | 下 | 彡 | 彳 | 小 | 上 | 十 | 匚 |
| 4 | 口 | 巾 | 弓 | 马 | 宀 | 冫 | 比 | 戈 | 夫 | 天 | 二 |
| 5 | 王 | 不 | 木 | 手 | 午 | 分 | 今 | 火 | 月 | 水 | 厂 |
| 6 | 少 | 止 | 日 | 中 | 心 | 文 | 方 | 灬 | 左 | 右 | 几 |
| 7 | 去 | 白 | 禾 | 他 | 北 | 旦 | 且 | 用 | 田 | 四 | 八 |
| 8 | 立 | 糸 | 出 | 百 | 在 | 有 | 地 | 耳 | 共 | 西 | 儿 |
| 9 | 竹 | 舌 | 尖 | 回 | 男 | 衣 | 羊 | 米 | 走 | 車 | 卜 |
| 10 | 我 | 利 | 你 | 門 | 言 | 東 | 林 | 雨 | 和 | 金 | 刀 |
| 11 | 的 | 長 | 明 | 尚 | 京 | 馬 | 南 | 城 | 重 | 美 | 又 |
| 12 | 鳥 | 是 | 家 | 國 | 笑 | 哭 | 海 | 浴 | 再 | 愛 | 衤 |

| ARABIC NUMBER (mnemonic) | ENGLISH LETTER | CHINESE STROKE | VARIATION | STROKE-INDICATOR | ENGLISH NAMES | CHINESE NAMES |
|---|---|---|---|---|---|---|
| 0 Video | V v | ↵ (14A) | ′ ⸴ | • | V-Stroke or Videodot | V-Bihua Diaann 点 |
| 1 Hot | H h | ⊢ (14B) | — - | → | H-Stroke or Horizontal | H-Bihua Henng 横 |
| 2 Line | L l | ↓ (14C) | l ı | ↓ | L-Stroke or Longitudinal | L-Bihua Shuu 竖 |
| 3 Jets | J j | J (14D) | ノ ノ | ↙ | J-Stroke or Jut-left | J-Bihua Ppiee 撇 |
| 4 In | I i | ↘ (14E) | ⸜ ⸝ | ↘ | I-Stroke or In-slash | I-Bihua Naa 捺 |
| 5 Time | T t | ✗ (14F) | ✗ ✗ | ↗ | T-Stroke or Tick-cross | T-Bihua Tiitx 提 |
| 6 Graphs | G g | ↲ (14G) | ι ᵥ | ↲ | G-Stroke or G-hook | G-Bihua Gou 钩 |
| 7 Neatly | N n | ⊐ (14H) | ⊓ ⌐ | ⊐ | N-Stroke or N-bend | N-Bihua Wan 弯 |
| 8 Copies | C c | ↶ (14I) | ↳ ↳ | ↶ | C-Stroke or C-Curve | C-Bihua Qu 曲 |
| 9 Zigzag | Z z | ᘔ (14J) | ᘔ 3 | ᘔ↑ | Z-Stroke or Zig | Z-Bihua Zhhe 折 |

| NUMBER of STROKES | STROKE CODE | IDEO-GRAPH | ENGLISH WORD | JAPANESE ROMAJI | CHINESE PINYIN |
|---|---|---|---|---|---|
| 1 | H | 一 | one | ichi | yī |
| 2 | CL | 凵 | pit | shitabako | ǎo |
| 2 | HC | 七 | seven | shichi | qī |
| 2 | HH | 二 | two | ni | èr |
| 2 | HJ | 厂 | slope | gandare | ǎn |
| 2 | HL | 十 | ten | jū | shí |
| 2 | JC | 儿 | son | hitoashi | ér |
| 2 | JZ | 几 | side-table | tsukue | jī |
| 2 | JI | 八 | eight | hachi | bā |
| 2 | LH | 卜 | divining | to | bǔ |
| 2 | NI | 又 | again | mata | yòu |
| 2 | NJ | 刀 | knife | katana | dāo |
| 2 | UH | 亠 | lid-header | nabe-buta | diǎn-héng |
| 2 | UN | 冖 | bald-cover | wa kanmuri | mī |
| 2 | UU | 冫 | 2-drops-of-water | nishi | liǎng-diǎn-shuǐ |
| 2 | ZI | 廴 | stretching-radical | ennyo | zǒu-zhī-páng |
| 2 | ZJ | 九 | nine | ku | jiǔ |
| 2 | ZL | 阝 | ear-sider-radical | kozato | ěr-dōu-páng |
| 3 | CCC | 巛 | river-radical | kawa | chuān-zī-páng |
| 3 | CJH | 女 | female/radical | onna | něu |
| 3 | CLL | 山 | hill-radical | yama hen | shān |
| 3 | HHH | 三 | three | san | sān |

*FIG. 9*

CHINESE TIENSTROKES SAMPLE DICTIONARY

| TIENSTROKES CODE | IDEOGRAPHIC CHARACTER | ENGLISH WORD | JAPANESE ROMAJI | CHINESE PINYIN |
|---|---|---|---|---|
| H | 一 | one | ichi | yī |
| HH | 二 | two | ni | èr |
| HHH | 三 | three | san | sān |
| LNJCH | 四 | four | shi | sì |
| HLNH | 五 | five | go | wǔ |
| VHJI (VHVV) | 六 | six | roku | liù |
| HC | 七 | seven | shichi | qī |
| JI | 八 | eight | hachi | bā |
| ZJ | 九 | nine | ku | jiǔ |
| HL | 十 | ten | jū | shí |
| HJLNHH | 百 | hundred | hyaku | bǎi |
| JHJTGJV | 我 | I/myself | ware | wǒ |
| JLJNJJI (JLJNJVV) | 你 | you | kimi | nǐ |
| JLNLC | 他 | he | hoka | tā |
| LNHLH | 田 | ricefield | ta | tián |
| CJHNJH (HCJNJH) | 好 | good | yo[i] | hǎo |

FIG. 10

| 1ST THROW / 2ND THROW | 2 | 3 | 4 | 5 | 6 | 7 | 8 | 9 | 10 | 11 | 12 |
|---|---|---|---|---|---|---|---|---|---|---|---|
| 2 | 亠 | 冂 | 氵 | 子 | 阝 | 巛 | 女 | 山 | 三 | 干 | 一 |
| 3 | 大 | 万 | 工 | 扌 | 下 | 彡 | 彳 | 小 | 上 | 十 | 匚 |
| 4 | 口 | 巾 | 弓 | 马 | 宀 | 氵 | 比 | 戈 | 夫 | 天 | 二 |
| 5 | 王 | 不 | 木 | 手 | 午 | 分 | 今 | 火 | 月 | 水 | 厂 |
| 6 | 少 | 止 | 日 | 中 | 心 | 文 | 方 | 灬 | 左 | 右 | 几 |
| 7 | 去 | 白 | 禾 | 他 | 北 | 旦 | 且 | 用 | 田 | 四 | 八 |
| 8 | 立 | 糸 | 出 | 百 | 在 | 有 | 地 | 耳 | 共 | 西 | 儿 |
| 9 | 竹 | 舌 | 尖 | 回 | 男 | 衣 | 羊 | 米 | 走 | 車 | 卜 |
| 10 | 我 | 利 | 你 | 門 | 言 | 東 | 林 | 雨 | 和 | 金 | 刀 |
| 11 | 的 | 長 | 明 | 尚 | 京 | 馬 | 南 | 城 | 重 | 美 | 又 |
| 12 | 鳥 | 是 | 家 | 国 | 笑 | 哭 | 海 | 浴 | 再 | 爱 | 裯 |

GAME FOR ENCODING OF IDEOGRAPHIC CHARACTERS SIMULATING ENGLISH ALPHABETIC LETTERS

BACKGROUND OF THE INVENTION

This invention is related to a game for teaching the decoding of Chinese ideographic characters by a process of pattern recognition with the English alphabetic letters.

Each Chinese character incorporates one of ten writing components called strokes. I have developed a method of designating an English letter for each stroke to decode Chinese characters. The concept is also applicable to other languages such as Japanese, Korean, German and Arabic.

The concept, known as the Tienstrokes method, evolved from the discovery of ten basic strokes used in all Chinese characters. The system for decoding any particular Chinese or Japanese ideograph is to first count the number of strokes in the ideograph, recording the number. Then each stroke is converted into a Tienstrokes alphabet character. There are ten strokes in the Tienstrokes alphabet code namely V, H, L, J, I, T, G, N, C, Z. Thus, a Chinese ideograph having five strokes is converted into a five character code of English letters. The code is then located in a dictionary to determine an English definition of the ideograph.

The purpose of this invention is to provide means for teaching the decoding process to a user so that he can then play an innovative game which depends on a working knowledge of the Tienstrokes process.

The teaching materials comprise a loose-leaf bound volume having a series of pages containing the game information. The pages are flipped back and forth while the user goes through a process of pattern recognition between the ten possible strokes in a Chinese ideograph, and their English letter counter parts. Once the user has a working knowledge of the pattern recognition procedure, and how to locate a decoded ideograph in the dictionary, he is prepared to play the game with others using a pair of dice, or to use the decoding process on a computer key board, or other communication devices.

Other advantages of the invention will become apparent to those skilled in the art to which the invention pertains upon reference to the following detailed description.

THE DRAWINGS

The description refers to the accompanying drawings in which like reference characters refer to like parts throughout the several view, and in which.

DETAILED DESCRIPTION OF THE PREFERRED EMBODIMENT

A typical Chinese stroke is produced by a brush and ink (like a felt pen), beginning when the brush touches the paper, and ending when the brush is lifted from the paper. An ideograph is composed of one or more strokes.

Figure 2:
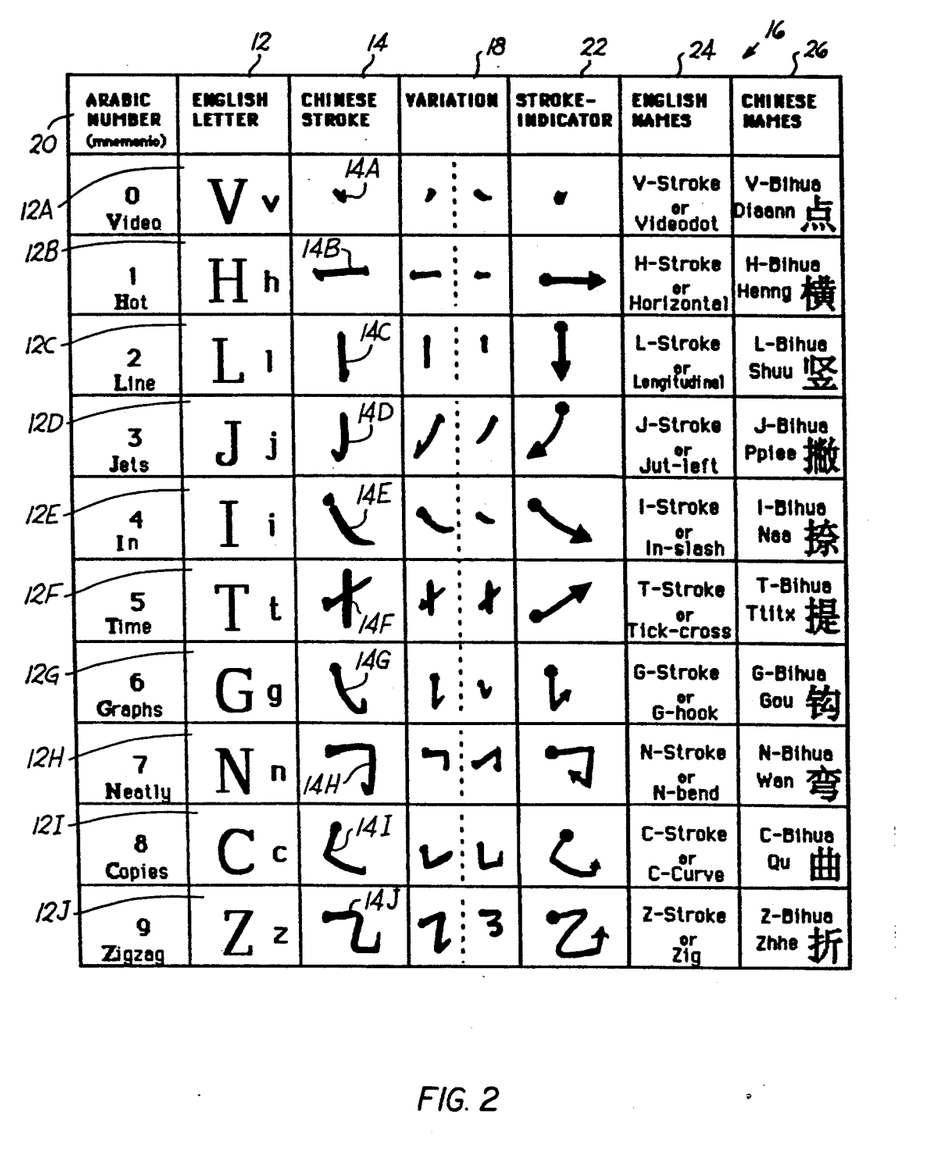
FIG. 2 is a table of the Arabic number, English letters, Chinese strokes and variations for playing the Tienstrokes game.

The game is based on the concept that any Chinese character may be broken down into ten basic strokes. Referring to FIG. 2, ten basic strokes have English letter counterparts illustrated in column 12, respectively as 12A, 12B, 12C, 12D, 12E, 12F, 12G, 12H, 12I and 12J. The ten basic Chinese strokes are listed in column 14 and designated as 14A, 14B, 14C, 14D, 14E, 14F, 14G, 14H, 14I and 14J. The basic strokes have the variations noted in Table 16, column 18.

Column 20 provides an Arabic number corresponding to the ten English letters and their corresponding Chinese strokes. The Arabic numbers are numbered respectively 0-9. A rhyme is useful for memorizing this code, i.e. "Video hot line, jets in time! Go, neatly! Come, zigzag!"

Except for the "V" stroke, each Chinese stroke has a direction indicator indicated in column 22. The direction indicator indicates the direction of the brush when making the stroke. Column 24 is the English name counterpart. A Chinese name counterpart for each of the strokes is noted in column 26.

Figure 1:
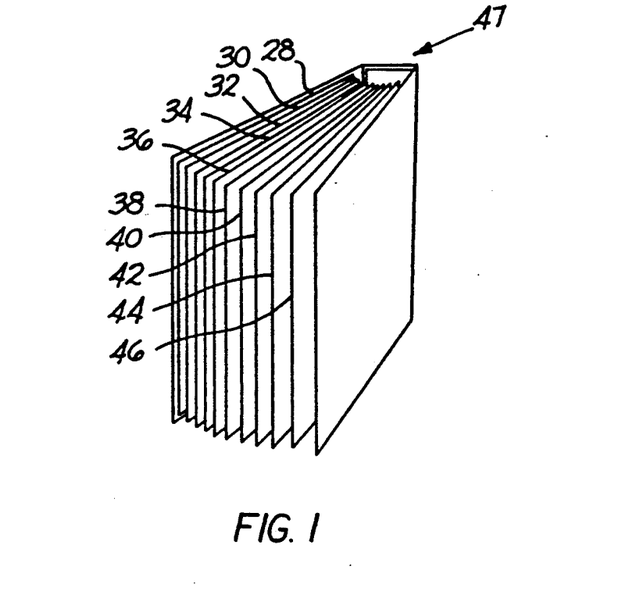
FIG. 1 is a perspective view of a binder containing the instructional materials disposed in an upright position to facilitate flipping the pages back and forth.

Referring to FIG. 1, ten sheets of stiff paper 28, 30, 32, 34, 36, 38, 40, 42, 44, 46 are mounted in a three ring binder 47. Each page can be flipped back and forth readily for viewing opposite sides of each page.

Each page may comprise a pair of pages contained within a transparent plastic envelope, or it may comprise a single page of a stiff paper with a relatively hard surface.

Chinese stroke 14A and the stroke indicator corresponding to stroke 14A, as shown in column 22, is marked on one side of page 28. The English equivalent "V" as shown in 12A, is marked on the opposite side of the page. Similarly, page 30 has horizontal Chinese stroke 14B on one side, and the corresponding English stroke "H" on the other side. Page 32 has the Chinese "L" stroke 14C on one side and the English letter "L" 12C on the opposite side. Page 34 has the Chinese "J" stroke 14D on one side and the English letter "J" 12D on the opposite side. Page 36 has the Chinese "I" stroke 14E on one side and the English letter "I" 12E on the opposite side. Page 38 has the Chinese "T" stroke 14F on one side and the English letter "T" 12F on the opposite side. Page 40 has the Chinese "G" stroke 14G on one side and the English letter "G" 12G on the opposite side. Page 42 has the Chinese "N" stroke 14H on one side and the English letter "N" 12H on the opposite side.

Page 44 has the Chinese "C" stroke 14I on one side and the English letter "C" 12I on the opposite side. Page 46 has the Chinese "Z" stroke 12J on one side and the English letter "Z" 12J on the opposite side.

The first step in the educational process is to assist the user in memorizing the relationship between the ten English letters and the corresponding Chinese strokes. One of the ten Chinese strokes of column 14 is written on a sheet of paper. The student looks at the written Chinese stroke to recognize the corresponding English letter. He is instructed that no vowels are allowed in making the comparison except for the small "i". There are no repeat letters, capital, or small. He then writes down his impression of the corresponding English letter.

For example, if the Chinese stroke is a "V" or a "." (dot), if correctly analyzed, the student will then write down a "V". He checks the answer by viewing the reverse side of page 28. He can reverse this process by looking at the English letter to see if he can accurately recall the corresponding Chinese stroke. The final step is to write what he believes to be the corresponding Chinese stroke indicator in column 22. He may keep score as he progresses through each of the Chinese strokes to record his progress. The student may repeat the process until he has memorized the Chinese strokes, their English counterparts and the directional strokes.

The next step is to practice this pattern recognition procedure on a Chinese ideograph.

Figure 3:
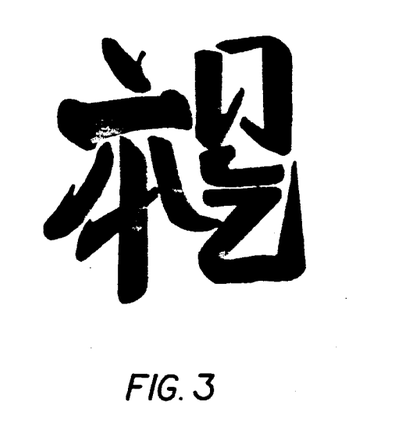
FIG. 3 is a specimen Chinese character.
Figure 4:
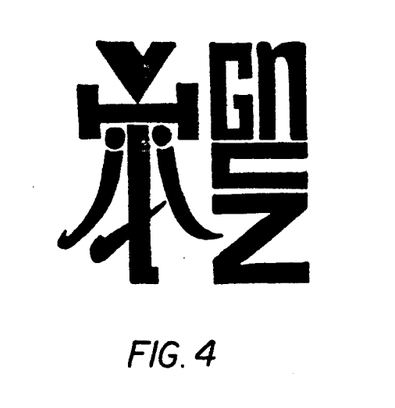
FIG. 4 shows the character of FIG. 3 with the strokes in their English letter form.
Figure 5:
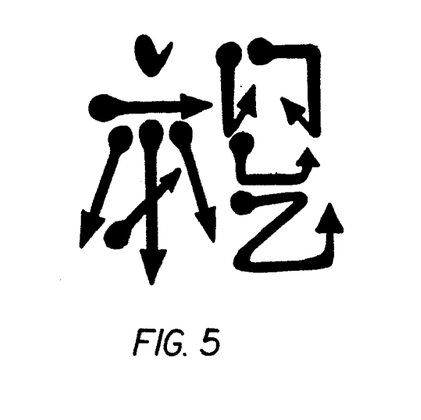
FIG. 5 is the character of FIG. 3 with the strokes in the directional coded form.

A representative Chinese ideograph is illustrated in FIG. 3. The transformation into its most look-alike English letters is illustrated in FIG. 4. They are recorded in their numeric stroke order as VHLJITGNCZ. This is the coded form of the ideograph. FIG. 5 illustrates the individual strokes of the ideograph of FIG. 3 as directional stroke indicator. These last three figures all relate to a Chinese ideograph that incorporates all of the strokes of the Tienstrokes alphabet.

Figure 6:
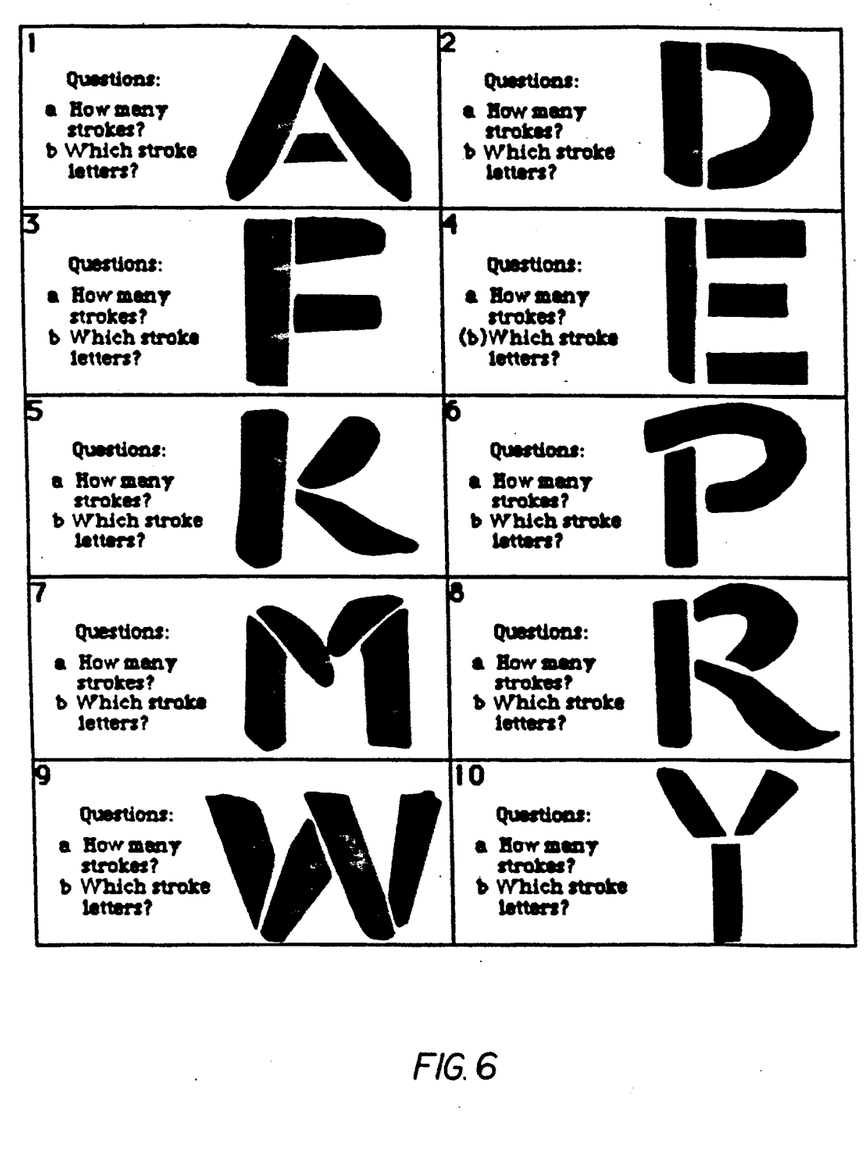
FIG. 6 is a table of questions for decoding English letters with Tienstrokes graphic alphabet.
Figure 7:
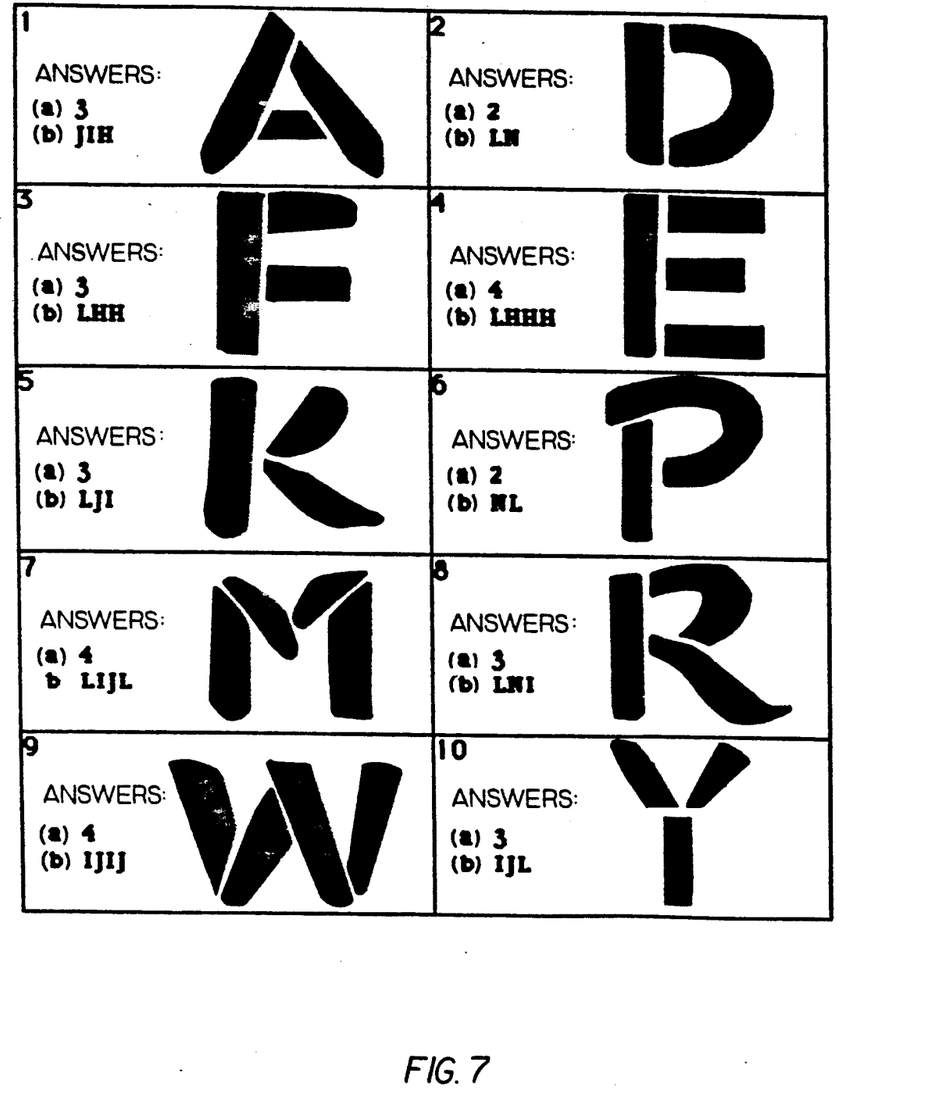
FIG. 7 shows the answers for the questions of FIG. 6.

As an advanced exercise, the user practices coding English letters into the Tienstrokes letters. For each English letter, the question is asked how many Chinese strokes are in the English letter. The second question is which Tienstrokes are they. FIGS. 6 and 7 illustrate typed questions and answers which may be provided on separate sheets in the binder. Note that each answer has an English letter sequence that corresponds to the number of strokes. The code is in English letter sequence. For example, Question 1 has three strokes and therefore three English letters in the code e.g. "JIH".

Figure 10:
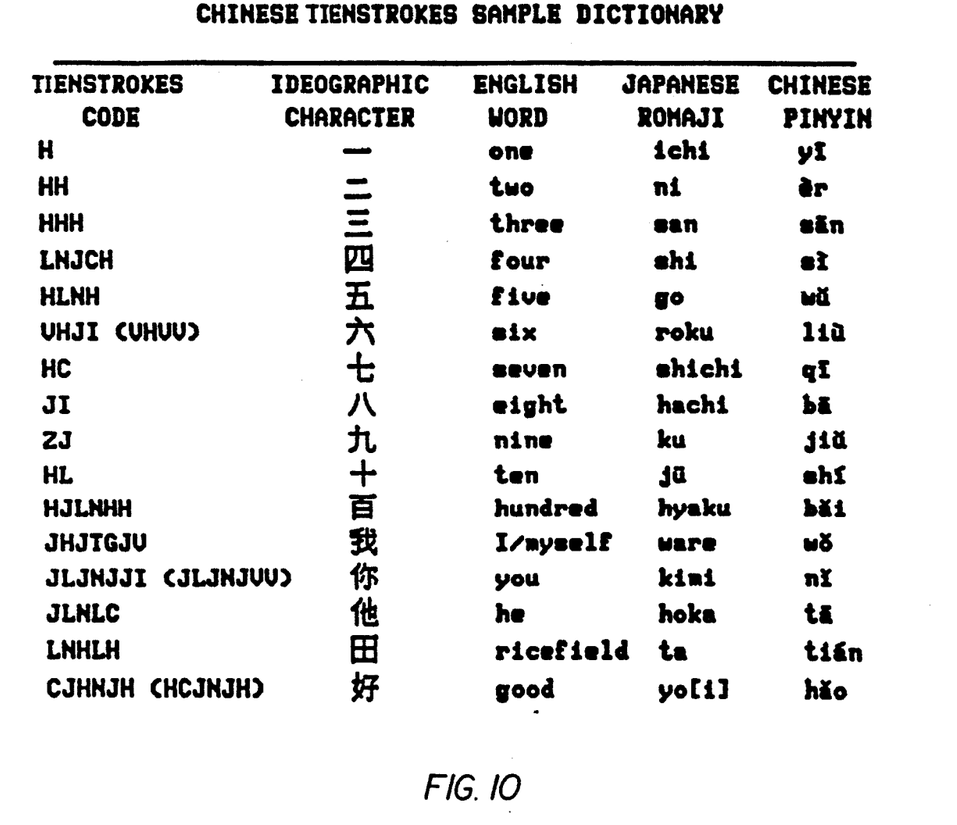
FIG. 10 is a sample dictionary providing English names or words of various Chinese ideographs.

As a result of mastering the Tienstrokes alphabet, the user can then translate an ideograph, such as a Chinese or Japanese character, into English letters by the Tienstrokes method. The method results in a code, a series of English letters which correspond to the ideograph. The English chosen word of the ideograph is then located in the Tienstrokes Dictionary. A partial dictionary is illustrated in FIG. 10.

Figure 8:
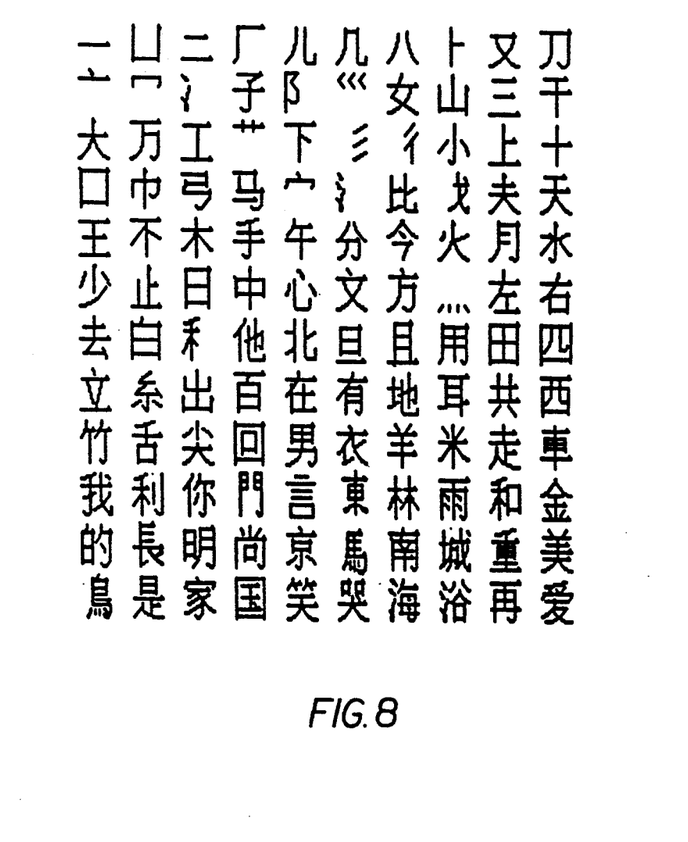
FIG. 8 is an array of 100 ideographs to be decoded during an exercise.
Figure 9:
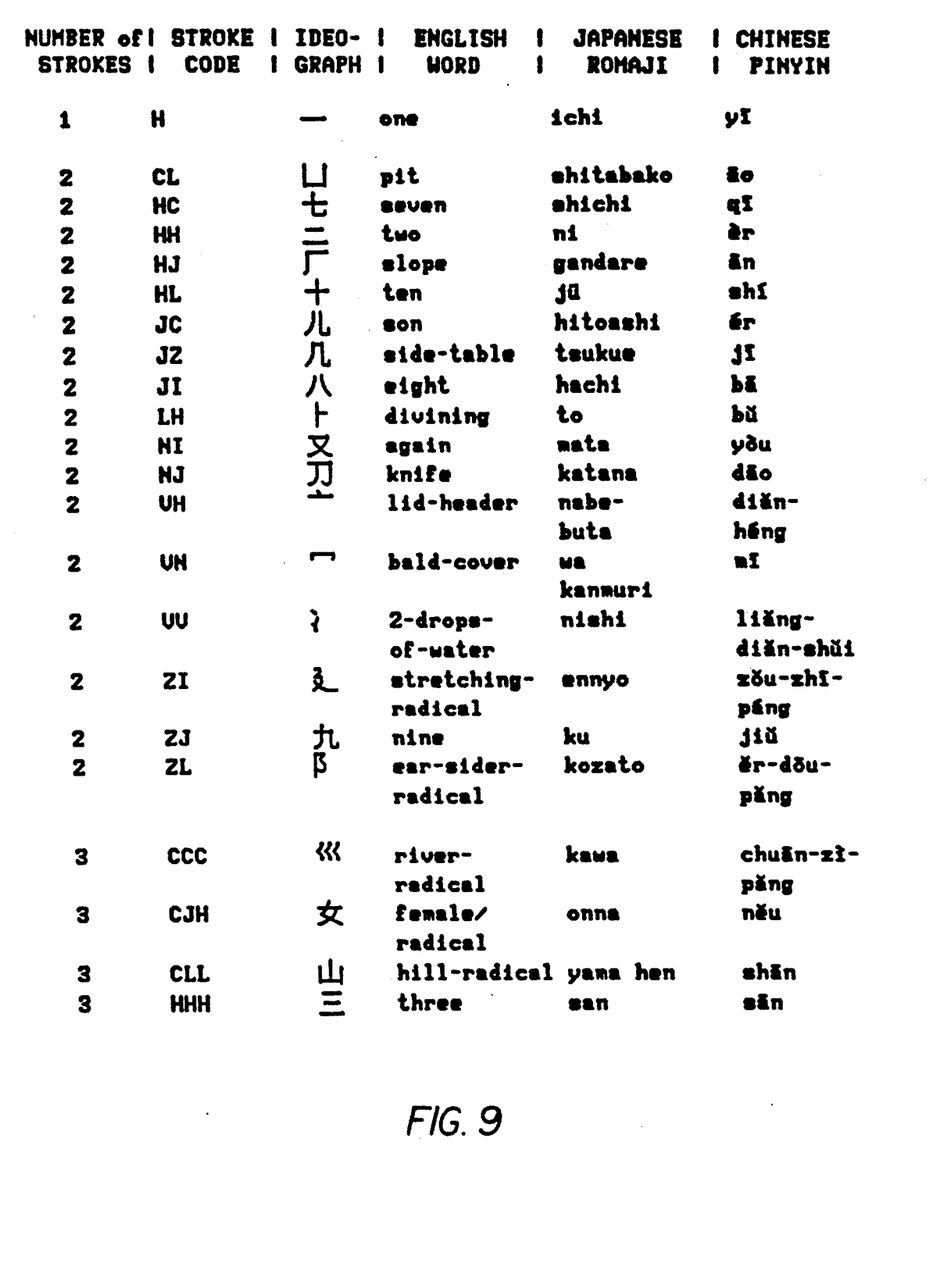
FIG. 9 are the English coded forms of some of the ideographs of FIG. 8.

To summarize, the Tienstrokes method is to select an ideograph. Count the number of strokes in the ideograph. Record the number. Convert each stroke into a corresponding English letter to form a sequence of English letters, e.g. a code. The code is then located in the dictionary. An example of this exercise is illustrated in FIG. 8 which shows a number of ideographs that can be decoded. The corresponding code for several of the ideographs is illustrated in FIG. 9. For example the first item in FIG. 8 is a horizonal line. This is a single stroke corresponding to the "H" stroke and the code leads as to "one" us the corresponding English word.

Having mastered the Tienstrokes procedure, the user is then prepared to play the Tienstrokes board game. The requirements for playing the game are Tienstrokes character grid 50 shown in FIG. 11, a game dictionary and a pair of dice 52. The grid has 121 ideographs. The ideographs are selected as an example, the grid could comprise other ideographs. Further, the number of rows and columns are arbitrary, there could be a greater or lesser number of rows. A pair of Tienstrokes dice 53-54 (see FIGS. 12a and 12b) may be used.

Figure 11:
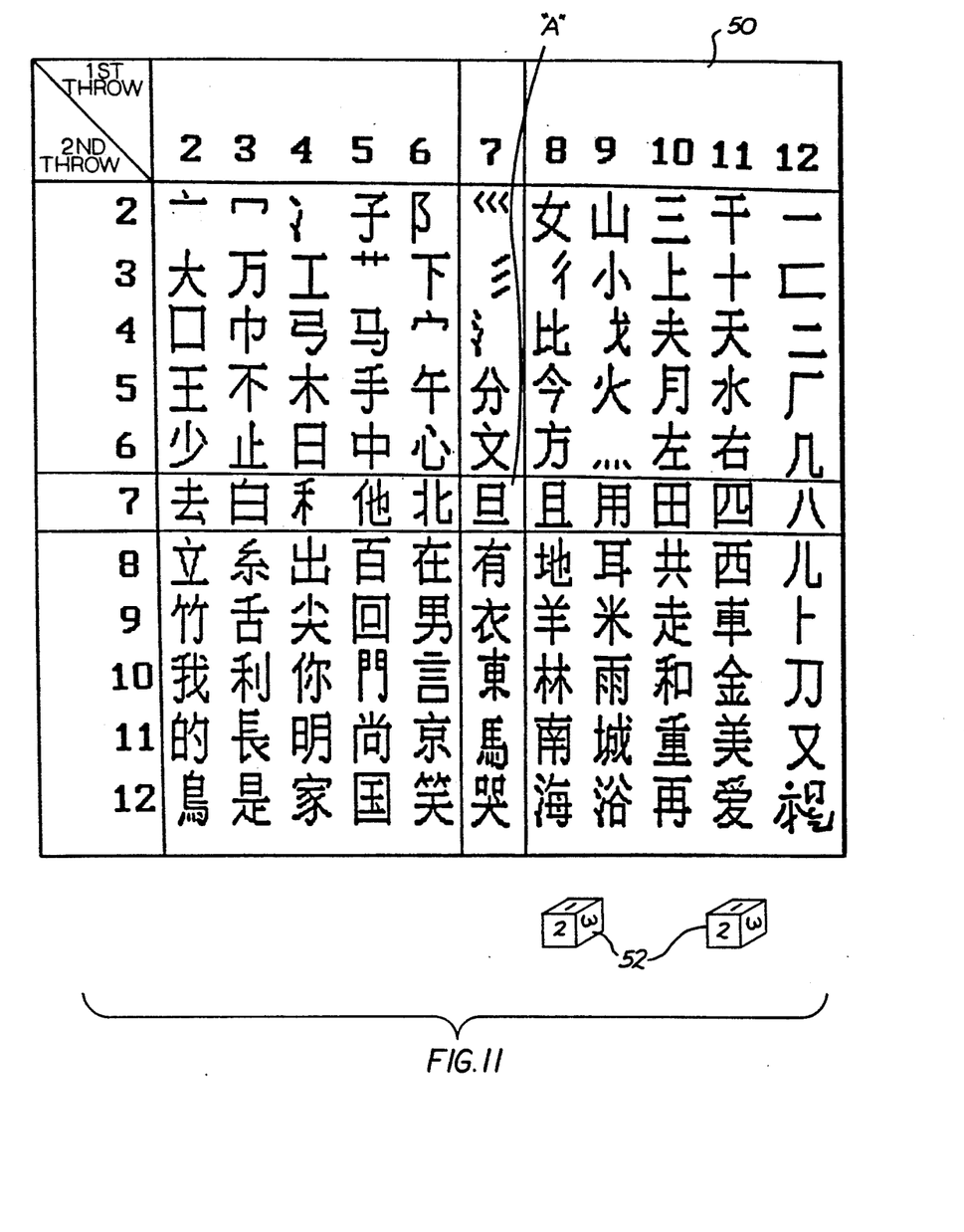
FIG. 11 illustrates a game board and dice for playing the Tienstrokes.
Figure 12A:
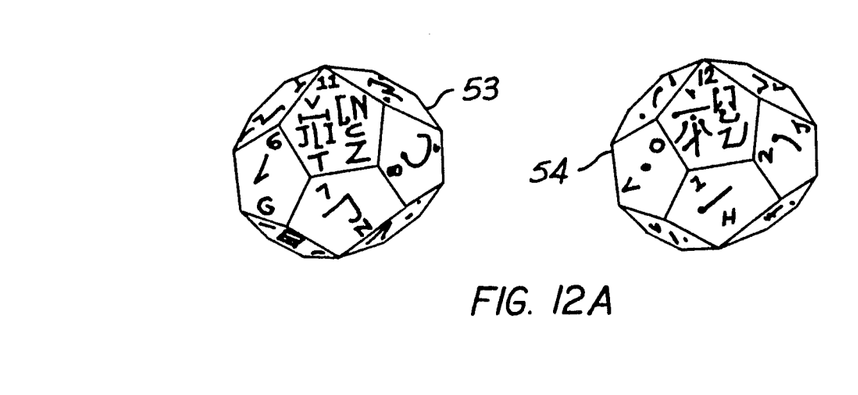
FIG. 12A illustrates a pair of 10-sided dice for playing the Tienstrokes game.
Figure 12B:
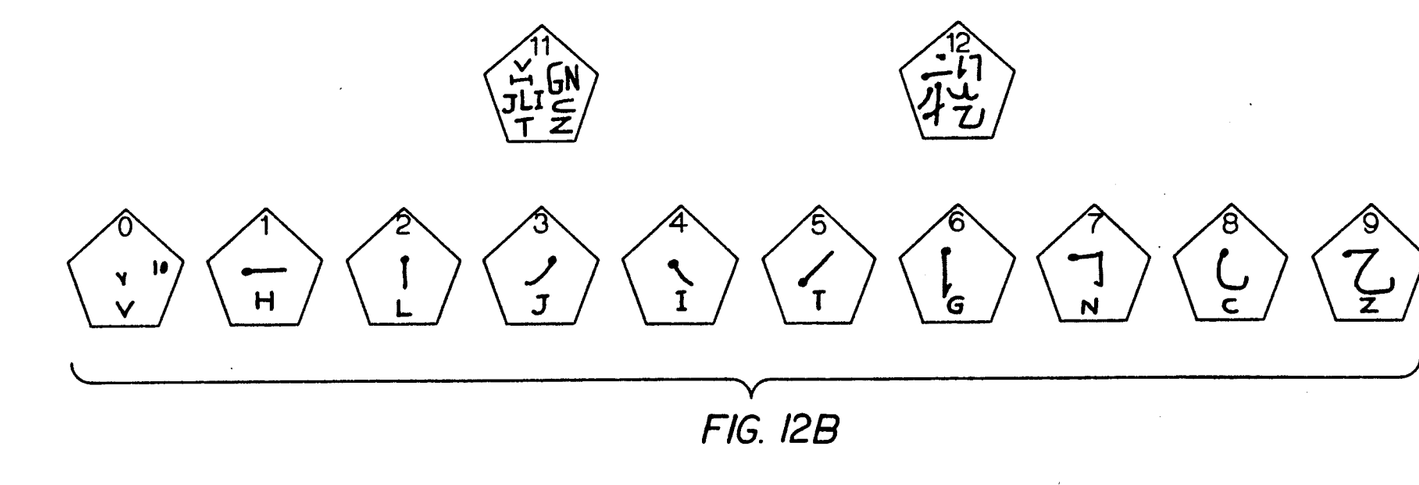
FIG. 12B illustrates the indicia on the 10 sides of the dice of FIG. 12A.

The arrangement is set up for two players, however, one player can play solitaire. The game will accommodate as many as ten players. First each player throws the dice to open the game. The highest dice score is the first player. The thrower of the lower score serves as the first game host. Each player, in sequence, throws the dice twice. The first throw of the dice is for the horizontal or "X" coordinate, the second is for the vertical or "Y" coordinate. This pinpoints a particular ideograph. For example, if the first throw is a "7", and the second throw is a "7", then the ideograph indicated at "A" is pinpointed. The game host, who is also the holder of the dictionary, asks the player the three standard Tienstrokes game questions:

"1. How many strokes (in this Chinese character) 1, 2, 3, - 10?"

"2. Which strokes (of the ten English alphabetic strokes) V,H,L,J,I,T,G,N,C or Z?"

"3. What is the English definition of the ideograph?" The answer is located in the Tienstrokes', dictionary.

A typical scoring scheme may be to score five points for the right stroke number; five points for giving the correct English letters in order, three points for the correct English letters only; five points for the correct English word (if the dice throwing player offers a different English word, then the game host decides and rules). If the player gets a perfect 15 points for this ideograph, he earns an extra bonus play. There is no second bonus play. The goal of the game is to see who wins a 100 points first. Every player has the same number of turns to play to conclude the game. A player can win a bonus of 50 points if his dice points to the 121 character which is TIENSTROKES. The player must get all correct strokes in stroke order.

Having described my invention, I claim:

1. A game apparatus for teaching the decoding of ideographic characters, comprising; a game board having a surface with the image of a grid of a first number of horizontal rows of said ideographs, each row having said ideographs arranged in vertical alignment with corresponding ideographs in the other of said horizontal rows to form a second number of vertical columns;

die means for locating an ideograph in the grid comprising a first die having said first number of facets, each facet having indicia for indicating a corresponding horizontal row in the grid, and a second die having said second number of facets, each facet thereof having indicia indicating a corresponding vertical column in the grid to locate an ideograph.

2. A game apparatus as defined in claim 1, in which the first number is 12 and the second number is 12.

3. A game apparatus as defined in claim 1, in which the die means comprises a pair of dice, each die having a facet with a numerical indicia whereby a coordinate may be located by throwing the dice and summing up the indicia on a selected facet of the two dice.

4. A game for finding the English counterpart of an ideographic character comprising one or more visually perceptive ideographic strokes, comprising:
- a dictionary of English definitions, each of said definitions corresponding to a predetermined, different series of English letters, comprising V, H, L, J, I, T, G, N, C and Z, each series corresponding to the strokes of an ideographic character;
- means for selecting an ideographic character from a pool of ideographic characters, the ideographic character having one or more ideographic strokes; and
- means for displaying a series of English letters, each stroke in the selected ideographic character having a visual similarity to a letter in the series of English letters, the number of letters in the series corresponding to the number of strokes in the selected ideographic character;
- whereby the user can convert the selected ideograph to a series of English letters, and then locate the series of English letters in the dictionary.

* * * * *